Patented Aug. 11, 1936

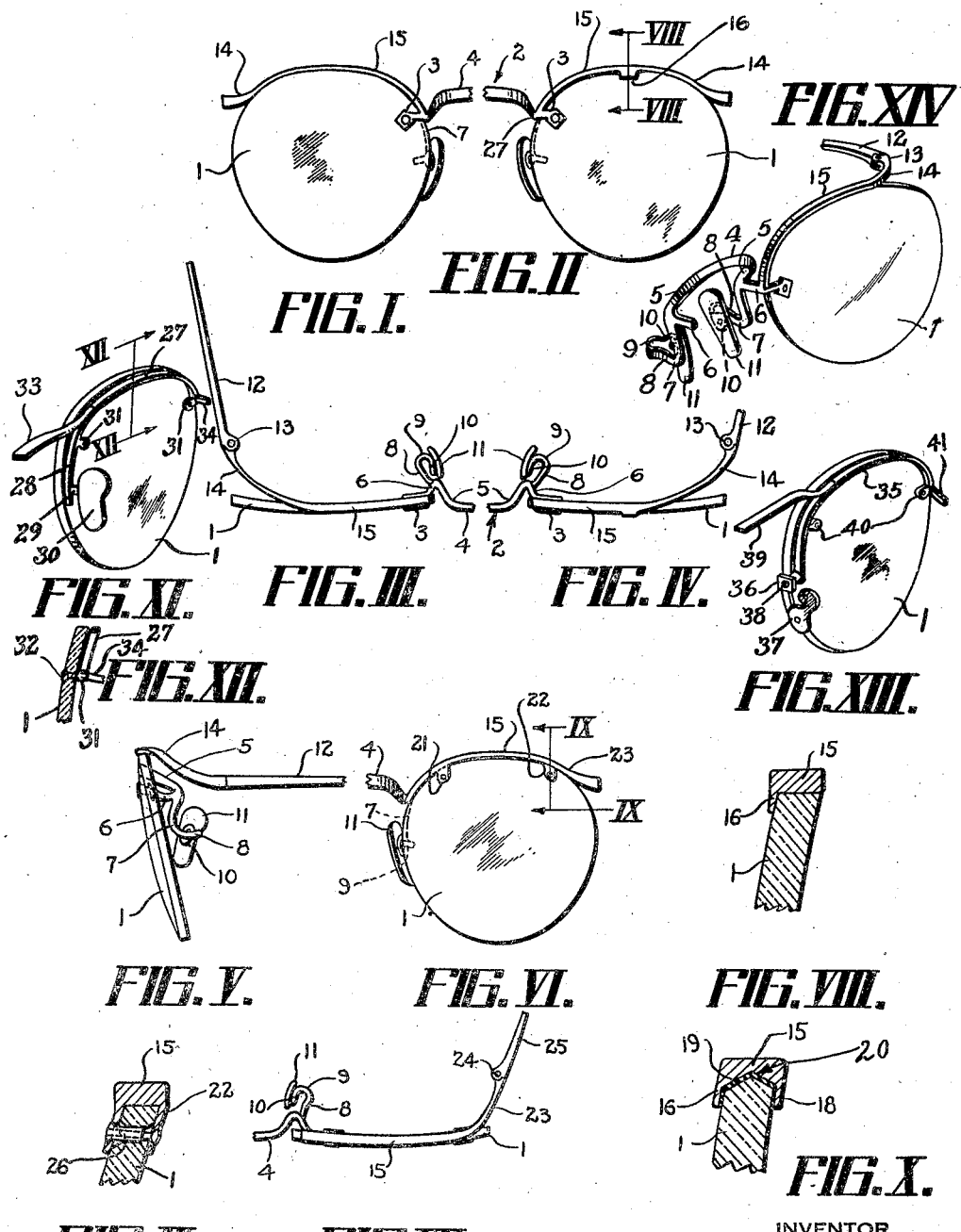

2,050,525

UNITED STATES PATENT OFFICE 2,050,525

OPHTHALMIC MOUNTING

Louis L. Gagnon, Southbridge, Mass., assignor to American Optical Company, Southbridge, Mass., a voluntary association of Massachusetts Application February 27, 1933, Serial No. 658,826

9 Claims. (Cl. 88—47)

REISSUED

This invention relates to improvements in ophthalmic mountings.

One of the principal objects of the invention is to provide an ophthalmic mounting having adjustable supporting means which may be quickly and easily adjusted to the facial requirements of different individuals.

Another object of the invention is to provide means in a rimless type mounting for removing strain created by the temples on the lenses.

Another object is to provide adjustable supports for the temples or sides of an opthalmic mounting of the above character.

Another object is to provide a rimless type mounting wherein the various parts thereof including the lenses, bridge, nose rests and temples may be quickly and easily adjusted to the facial requirements of different individuals.

Another object is to provide an improved adjustable resilient bridge member for supporting the lenses of a rimless type mounting.

Another object is to provide resilient supports for the temples or sides of a rimless type mounting.

Another object is to provide improved means of supporting the lenses.

Another object is to provide means wherein the temples and lens supporting means are removed from the useful field of side vision.

Another object is to provide simple, efficient and economical means of forming the parts of an ophthalmic mounting, wherein the cost of material and assembling operations are greatly reduced.

Other objects and advantages will become apparent from the following description taken in connection with the accompanying drawing, and it will be apparent that many changes may be made in the details of construction and arrangement of parts without departing from the spirit of the invention as expressed in the accompanying claims. I, therefore, do not wish to be limited to the exact details shown and described as the preferred forms only have been shown by way of illustration.

Referring to the drawing:

Fig. I is a fragmentary front elevation of an ophthalmic mounting embodying the invention;

Fig. II is a view similar to Fig. I showing a slight modification;

Fig. III is a plan view of Fig. I;

Fig. IV is a plan view of Fig. II;

Fig. V is a fragmentary side elevation of the mounting shown in Figures II and IV;

Fig. VI is a view similar to Fig. I showing another modification;

Fig. VII is a plan view of Fig. VI;

Fig. VIII is an enlarged sectional view taken on line VIII—VIII of Fig. II;

Fig. IX is an enlarged section taken on line IX—IX of Fig. VI;

Fig. X is a view similar to Fig. IX showing a modified form of the invention,

Fig. XI is a rear perspective view of a further modification;

Fig. XII is a fragmentary sectional view taken on line XII—XII of Fig. XI;

Fig. XIII is a view similar to Fig. XI of a further modification, and

Fig. XIV is a perspective view showing the connection of the bridge and rim portion to the lens holding means.

Much difficulty has been encountered, in the past, particularly in the so-called high endpiece mountings wherein the temples are normally closer to each other than in the past when the temples were connected at the horizontal center line of the lenses, in having the temples engage with the sides of the head of the wearer. During use the temples under such conditions would cut in the flesh and cause pain and discomfort. Another difficulty in the past, in a rimless type mounting, was that of having the lenses break at their connections to the mountings when the temples were bent during the removal or placing of the mounting on the face. It, therefore, is a principal object of this invention to provide adjustable means whereby the temples may be adjusted relative to the sides of the head and to eliminate strain on the lenses created by bending the temples when the mounting is being removed or placed on the face.

Referring to the drawing wherein similar characters of reference denote corresponding parts throughout the several views, the device embodying the invention as shown in Figures I and III comprises a pair of lenses 1 connected by a bridge member 2 which is secured to the lenses by means of the lens straps or clamp members 3. The said straps or clamp members 3 may be provided with openings aligned with an opening in the lens through which a screw member may be positioned to draw the clamp members together to secure the lenses therebetween or may be secured to said lenses by a solder, cement or other connection.

The bridge member 2 is formed with a central arch portion 4 having rearwardly extending end portions 5 which are looped and turned forwardly at 6 for attachment to the lens holding members or straps 3. A relatively long depending guard arm support 7 extends downwardly from the end portion 5 substantially in the rear of the peripheral edge of the lens on each side of the bridge 2 and extends rearwardly at 8 to a loop 9 which terminates in a forwardly extending nose guard or pad connection 10 to which the nose guard or pad 11 is attached. The central arch portion 4 may be rigid, ductile, or resilient as desired. Attention is directed to the fact that the bridge arch, lens and nose pad supports are adjustable independently of each other and without danger of causing one adjustment to be displaced when the other is being made.

The mounting is supported on the face of the wearer by the temples or sides 12 which are pivotally attached at 13 to relatively long rearwardly extending adjustable supports 14. The said supports 14 are shaped at 15 to the peripheral edges of the lenses and are attached at 27 to the lens straps or clamp members 3 or to the adjacent ends of the bridge member. The supports 14 may be rigid, ductile or resilient as desired or may have different portions thereof formed with one or more of the above characteristics. These results may be accomplished by the proper selection and combination of materials or by the proper treatment of said materials.

In the structure shown in Figures I and III the portion 15 is preferably formed rigid and the portion 14 may be ductile or resilient as desired or may have a portion ductile and another portion resilient. The portion 15 may be resilient if desired and may be flat or grooved to fit over the peripheral edge of the lens and may be shaped to abut with said edge.

In Figures II and VIII the portion 15 is provided with a depending lip 16 substantially at the point wherein the portion 14 joins with said portion 15. The lip 16 in use is adapted to overlie the front edge of the lens and is adapted to be held in engagement with said edge by a slight pressure caused by the portion 15. This constant urging of the lip 16 in engagement with the edge of the lens tends to hold the portion 15 in aligned relation with said edge during the use of the mounting.

In Fig. X there is shown a slight modification wherein instead of a single lip 16 such as shown in Fig. VIII the portion 15 is provided with spaced lips 17 and 18. The said lips are adapted to engage the front and rear faces of the lens and may be held in engagement with said edge by the member 15 as described above or may be secured to said edge by cement or other means 19. If desired the portion 15 and the upper edge of the lens may be bevelled as shown at 20 in Fig. X.

In Figures VI, VII and IX there is shown another modification wherein the portion 15 is secured adjacent its opposite ends to the upper edge of the lens by suitable lens straps 21 and 22. In this instance the portion 15 extends substantially the full width of the top of the lens and is provided with a sharply turned rearwardly extending temple support 23 having a temple hinge connection 24 thereon to which the temple 25 is pivotally attached. The support 23 may be rigid, ductile or resilient as desired or may be formed with one or more of the above characteristics.

The lens straps 21 and 22 may be provided with openings aligned with openings in the lens and may be secured thereto by telescoping connecting means 26, as shown in Fig. IX, or may be secured by screws, solder, cement or other means.

The telescoping means 26 may be secured together by a threaded connection or may be united by solder, cement or other means.

In all instances the temple supports 14 and 23 are adapted to be adjustable sidewise, up or down and shortened or lengthened as desired to change the position and length of temple. This shortening or lengthening effect may be obtained by bending the supports 14 and 23 intermediate their ends.

Attention is directed to the fact that in the structures shown in Figures I to V inclusive, all strain created by the bending of the temples when the mounting is being removed or placed on the face is eliminated from the lenses as the temple supporting portions 14 and 15 are not connected directly to said lenses. The strain in this instance is taken up by the bridge member 2.

By making the portion 15 in Figures VI and VII rigid and the arch 4 and temple support 23 resilient all strain on the lenses created by the bending of the temples is eliminated.

In Figures XI and XII there is shown a further modification wherein the lens supporting means 27 is shaped to the contour shape of the upper peripheral edge of the lens 1 but is positioned in the rear of said edge so that it will be substantially invisible when the mounting is viewed from the front. The support 27 follows the rear surface of the lens about its upper peripheral edge and extends downwardly on the nasal side of said lens to form a supporting portion 28 for the guard arm 29 and guard 30. The support 27 is attached to the lens 1 by perforated lugs 31 each having a threaded bore which is in aligned relation with attaching openings in the lens. A connecting member such as a screw 32 having an enlarged head portion is placed in the aligned openings from the front of the lens and is threadedly connected with the threaded bore of the lugs 31.

The support 27 is adapted to provide attaching means for the bridge 33 and the adjustable temple support 34.

In Fig. XIII there is shown a further modification which is generally similar to that shown in Fig. XI except that the lens support 35 is provided with a stud box connection 36 to which the guard 37 is interchangeably attached by the connecting screw or like means 38. The bridge 39 is attached to the lens support 35 adjacent the top of the mounting and is formed resilient so that the resiliency thereof may be used to cause the guards to grip the nose and hold the mounting on the face of the wearer. The mounting in this instance may or may not be provided with the relatively long adjustable temple supports 41 as desired. The support 35 is connected to the lens 1 by the connecting lugs 40 in a manner similar to that set forth in the structure shown in Figures XI and XII.

From the foregoing description it will be seen that I have provided simple, efficient and economical means of accomplishing all of the objects and advantages of the invention, particularly that of providing adjustable supports for the temples and of removing all strain on the lenses created by the bending of the temples.

Having described my invention, I claim:

1. In a device of the character described in combination with a pair of lenses, means for connecting said lenses, said means having a relatively long bar like portion shaped to the upper peripheral edge of a lens and to follow the contour of said edge to a point substantially mid way of the lens and extending rearwardly of the plane of the lens from said point and terminating in a temple connection, and means adjacent said mid point for securing the bar like portion to the lens.

2. In a device of the character described in combination with a pair of lenses, means for connecting said lenses, said means having a relatively long rigid portion shaped to the upper peripheral shape of a lens and to follow the contour edge of said lens to a point substantially mid way of said lens and terminating in a relatively ductile portion extending rearwardly of the plane of the lens from said point and having a temple connection adjacent the end thereof, and means adjacent said mid point for securing the rigid portion to the lens.

3. A bridge for an ophthalmic mounting comprising a central arch portion having rearwardly and downwardly extending end portions which are looped and turned forwardly for attachment to lens holding means, said looped portions having a portion extending downwardly to a turn thence rearwardly to a turn and terminating in a forwardly extending nose guard attachment and said forwardly extending portions for attachment to the lens holding means each having a relatively long temple supporting portion thereon.

4. A bridge for an ophthalmic mounting comprising a central arch portion having rearwardly and downwardly extending end portions which are looped and turned forwardly for attachment to lens holding means, said looped portions having a portion extending downwardly to a turn thence rearwardly to a turn and terminating in a forwardly extending nose guard attachment and said forwardly extending portions for attachment to the lens holding means each having a relatively long temple supporting portion thereon, said temple supporting portion having a temple connection thereon and being adjustable intermediate its ends.

5. A bridge for an ophthalmic mounting comprising a central arch portion having rearwardly and downwardly extending end portions which are looped and turned forwardly for attachment to lens holding means, said looped portions having a portion extending downwardly to a turn thence rearwardly to a turn and terminating in a forwardly extending nose guard attachment and said forwardly extending portions for attachment to the lens holding means each having a relatively long resilient temple supporting portion thereon.

6. In a device of the character described in combination with a pair of lenses, means for connecting said lenses on the nasal sides thereof, said means having a central bridge portion and a relatively long bar like member shaped to the upper peripheral shape of each respective lens and to follow the upper contour edge of said lens substantially the width of the lens and terminating in a relatively long adjustable rearwardly extending portion having a temple connection adjacent the end thereof, said portion extending rearwardly from a point located between the vertical center line and the temporal edge of the lens, and lens holding means adjacent the bridge portion for attaching said bridge portion to the lenses adjacent the nasal sides thereof.

7. In a device of the character described in combination with a pair of lenses, means for connecting said lenses, said means having a central bridge portion and a relatively long bar like member shaped to the upper peripheral shape of the lens and to follow the upper contour edge of said lens substantially the width of the lens and terminating in a relatively long adjustable rearwardly extending portion having a temple connection adjacent the end thereof, lens holding means adjacent the terminal ends of the bridge portion for attachment to the lenses adjacent the nasal sides thereof and means on the relatively long bar like member for supporting the said bar in alignment with the edge of the lens.

8. In a device of the character described in combination with a pair of lenses, means for connecting said lenses, said means having a central bridge portion and a relatively long bar like member shaped to the upper peripheral shape of the lens and to follow the upper contour edge of said lens substantially the width of the lens and terminating in a relatively long adjustable rearwardly extending portion having a temple connection adjacent the end thereof, said portion extending rearwardly from a point adjacent the temporal edge of the lens and lying within the limit of said temporal edge and curving outwardly and rearwardly from said point to the temple connection, and spaced lens holding members on said bar like member adjacent the nasal and temporal sides thereof for attachment to the lens.

9. In a device of the character described for use in combination with a pair of lenses, means for connecting said lenses on the nasal sides thereof, said means having a central bridge portion and a relatively long bar-like member shaped to the upper peripheral shape of each respective lens and to follow the upper contour edge of said lens substantially in the plane of and extending substantially the width of the lens and terminating in a rearwardly extending portion having a temple connection adjacent the end thereof, said portion extending rearwardly from a point located between the vertical center line and the temporal edge of the lens, and lens holding means adjacent the bridge portion for attaching said bar-like members to the lenses adjacent the nasal sides thereof.

LOUIS L. GAGNON.